United States Patent [19]
Bell

[11] 4,151,578
[45] Apr. 24, 1979

[54] CAPACITIVE PRESSURE TRANSDUCER

[75] Inventor: Robert L. Bell, Chatsworth, Calif.

[73] Assignee: Kavlico Corporation, Chatsworth, Calif.

[21] Appl. No.: 820,767

[22] Filed: Aug. 1, 1977

[51] Int. Cl.² .............................................. H01G 7/00
[52] U.S. Cl. .................................... 361/283; 361/274
[58] Field of Search .................. 361/283, 274; 73/718, 73/724

[56] References Cited

U.S. PATENT DOCUMENTS

| | | | |
|---|---|---|---|
| 2,080,429 | 5/1937 | McNally | 361/283 |
| 2,755,419 | 7/1956 | Hollmann | 361/283 X |
| 3,405,559 | 10/1968 | Moffatt | 361/283 X |
| 3,645,137 | 2/1972 | Hazen | 73/718 |
| 3,715,638 | 2/1973 | Poyle | 361/283 X |

*Primary Examiner*—E. A. Goldberg
*Attorney, Agent, or Firm*—Gipple & Hale

[57] ABSTRACT

A capacitive pressure transducer including a pair of electrically insulative elastic diaphragms disposed adjacent each other and bonded together in a spaced apart relationship to form a sealed cavity, a conductive layer applied to the inside surface of each of the diaphragms and a small absolute pressure provided in the cavity. This small absolute pressure cavity essentially reduces the effects of the negative temperature coefficient of the modulus of elasticity of the diaphragms.

5 Claims, 4 Drawing Figures

CAPACITIVE PRESSURE TRANSDUCER

BACKGROUND OF THE INVENTION

1. Field of the Invention

This invention relates to pressure transducers and more particularly to capacitive type pressure transducers.

2. Description of the Prior Art

There exist in the prior art several types of capacitive pressure transducers. These pressure transducers have at least one common difficulty. This difficulty is a result of the effect upon the capacity of the capacitive pressure transducer of the negative temperature coefficient of the modulus of elasticity of the material of the diaphragms from which the capacitive transducer is made. To compensate for this effect, several techniques have been developed. Such techniques include such things as electronic compensation via the use of sensitive components such as thermistors and capacitors. Such techniques while substantially compensating for this effect add to the complexity of the capacitive pressure transducer. In addition, these techniques require individual testing of the capacitive pressure transducers and matching of the measured characteristics of the capacitive pressure transducer to those of the compensation components or the matching of the compensation components to the characteristics of the capacitive pressure transducer. In either case, the cost of manufacture of such a capacitive pressure transducer is increased. Accordingly, it is a general object of the present invention to provide a capacitive pressure transducer with increased temperature stability.

It is another object of the present invention to provide a capacitive pressure transducer with increased temperature stability which is relatively simple and low in cost.

SUMMARY OF THE INVENTION

In keeping with the principles of the present invention, the objects are accomplished by a unique capacitive pressure transducer. The capacitive pressure transducer includes a pair of electrically insulative elastic diaphragms disposed adjacent each other and bonded together in spaced apart relationship to form a sealed cavity, a conductive layer applied to the inside surface of each of the diaphragms and a small absolute pressure provided in the cavity. The small absolute pressure in the cavity corrects for the adverse effects of the negative temperature coefficient of the modulus of elasticity of the diaphragm upon the capacitance of the capacitive pressure transducer.

In a second embodiment of a capacitive pressure transducer in accordance with the teachings of the present invention, the capacitive pressure transducer is substantially the same as the first embodiment except that it includes only a single electrically insulated elastic diaphragm and a electrically insulated plate disposed adjacent the elastic diaphragm and bonded together in spaced apart relationship to form a sealed cavity.

BRIEF DESCRIPTION OF THE DRAWINGS

The above-mentioned features and objects of the present invention become more apparent by reference to the following description taken in conjunction with the accompanying drawings wherein like reference numerals denote like elements and in which.

DESCRIPTION OF THE PREFERRED EMBODIMENTS

Figure 1:
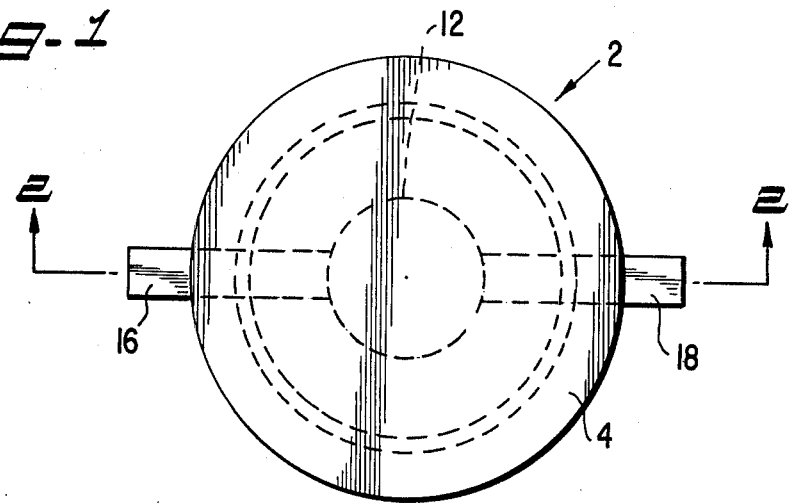
FIG. 1 is a top plan view of a capacitive pressure transducer in accordance with the teachings of the present invention.
Figure 2:
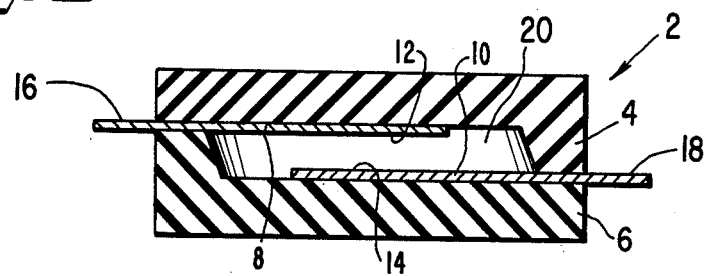
FIG. 2 is a cross-sectional view of the embodiment of FIG. 1 along the lines 2—2.

Referring more particularly to the drawings, shown in FIGS. 1 and 2 is one embodiment of a capacitive pressure transducer in accordance with the teachings of the present invention. The capacitive pressure transducer of FIGS. 1 and 2 is substantially the same and may be made in a substantially similar manner except for those differences noted in the following description as the capacitive pressure transducers disclosed in application for U.S. Pat., Ser. No. 666,188, assigned to a common assignee.

In particular, in FIGS. 1 and 2, the capacitive pressure transducer 2 comprises an upper non-conductive diaphragm 4 and a lower non-conductive diaphragm 6. Provided on the upper and lower diaphragms 4 and 6 are upper and lower diaphragm electrodes 8 and 10. Both the upper and lower diaphragm electrodes 8 and 10 comprise central circular portions 12 and 14 of conductive material provided on the inside surface of the diaphragms 4 and 6 and conductive paths 16 and 18 extending respectively from the central circular portion 12 of the upper diaphragm electrode 8 and the central circular portion 14 of the lower diaphragm electrode 10. In addition, the conductive paths 16 and 18 are provided such that they do not overlap.

The upper and lower diaphragms 4 and 6 are then sealed together in spaced apart relationship by any suitable means to form a cavity 20. A backfill or in other words a very small absolute pressure is sealed within the cavity 20.

In practice, non-conductive diaphragms 4 and 6 may be made from alumina. Furthermore, the conductive material can be a thin metalized layer. In particular, the electrodes 8 and 10 consisting of central portions 12 and 14 and conductive paths 16 and 18 can be formed by screening a metallic paste onto the non-conductive diaphragms 4 and 6 and firing the diaphragms 4 and 6. In addition, the non-conductive diaphragms 4 and 6 may be sealed together by a fired glass frit.

In operation, the very small absolute pressure provided in cavity 20 has a positive temperature coefficient and the modulus of elasticity of the diaphragms 4 and 6 has a negative temperature coefficient. Accordingly, since the modulus of elasticity has a negative temperature coefficient and the small absolute pressure or backfill provided in the cavity 20 has a positive temperature coefficient as a result of Boyle's law, the negative temperature coefficient effects of the modulus of elasticity are compensated for by the effect of the positive temperature coefficient of the backfill in cavity 20, as shown in FIG. 3.

Figure 3:
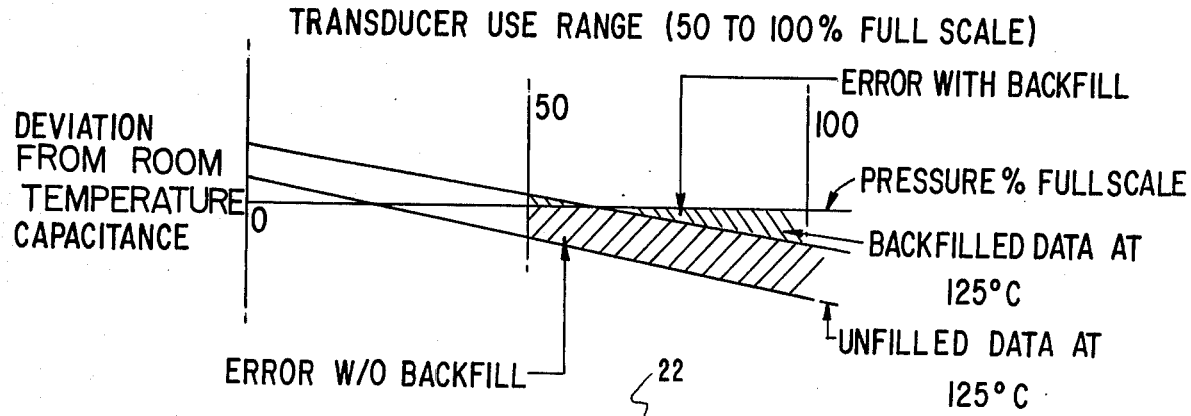
FIG. 3 is a graphical representation illustrating the improvement in operation of the capacitive pressure transducer in accordance with the teachings of the present invention.

In particular, as shown in FIG. 3, the error in the capacitance of a capacitive pressure transducer in accordance with the teachings of the present invention is substantially less than that of a prior art capacitive pressure transducer without backfill over the useful range from 50 to 100% of the full scale applied pressure. Accordingly, it should be apparent that with this simple low cost improvement, a capacitive pressure transducer which has substantially better temperature stability over the useful range can be produced.

Figure 4:
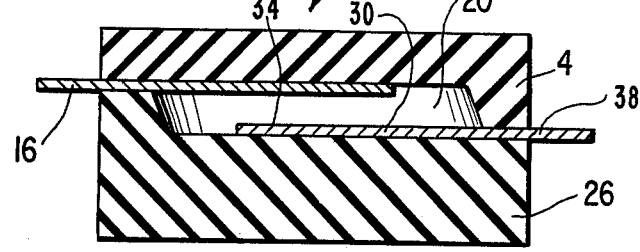
FIG. 4 is a cross-sectional view of a second embodiment of a capacitive pressure transducer in accordance with the teachings of the present invention.

Referring to FIG. 4, shown therein is a second embodiment 22 of a capacitive pressure transducer in accordance with the teachings of the present invention. Since the capacitive pressure transducer is similar to that of FIGS. 1 and 2, like elements in FIG. 4 are given like reference numerals and a description of their interconnection and operation will be omitted. As previously stated, the second embodiment of the capacitive pressure transducer shown in FIG. 4 is substantially the same as that shown in FIGS. 1 and 2 except that the lower diaphragm 6 has been replaced by a reference plate 26 having a reference electrode 30 comprising a central portion 34 and a conductive path 38.

In this embodiment, the effects of the small absolute pressure provided in the cavity 20 are the same as those previously described and the positive temperature coefficient of the small absolute pressure or backfill reduces or compensates for the effects of the negative temperature coefficient of the modulus of elasticity of the material from which the upper diaphragm 4 is made.

It should be apparent to one skilled in the art that the upper and lower diaphragms 4 and 6 and the reference plate 26 need not be made in a circular shape but could be also made triangular, square, rectangular, etc. In addition, the central portions 8, 10 and 34 need not always be circular and may be other shapes such as square, rectangular, elliptical, etc. Furthermore, the electrodes in a single transducer may be of different shape.

In all cases it is understood that the above described embodiments are merely illustrative of but a few of the many possible specific embodiments which can represent applications of the principles of the present invention. Numerous and varied other arrangements can be readily devised in accordance with these principles by those skilled in the art without departing from the spirit and scope of the invention.

What I claim is:

1. A capacitive pressure transducer comprising:
    a pair of electrically insulative elastic diaphragms disposed adjacent each other and bonded together by a fired glass frit in a spaced apart relationship to form a sealed cavity;
    a conductive layer applied to the inside surface of each of the diaphragms, the capacitance of said capacitive pressure transducer when unfilled having a negative temperature coefficient resulting from the modulus of elasticity of said spaced apart diaphragms and having a significant departure from rated capacitance throughout a desired useful range of 50% to 100% of full scale pressure; and
    means for substantially reducing said departure from said rated capacitance in said desired useful range, said means including a small absolute pressure with a positive temperature coefficient backfilled in said cavity so that the effects of the negative temperature coefficient of the modulus of elasticity of said diaphragms is substantially reduced over a useful range from 50 to 100% of full scale applied pressure.

2. A capacitive pressure transducer according to claim 1 wherein said electrically insulative elastic diaphragms are made from alumina.

3. A capacitive pressure transducer unit comprising:
    an electrically insulative elastic diaphragm;
    an electrically insulative reference plate disposed adjacent the electrically insulative elastic diaphragm and bonded to said electrically insulative elastic diaphragm by a fired glass frit in a spaced apart relationship to form a sealed cavity;
    conductive layers comprising a screened metallic paste coated on the inside surface of said electrically insulative elastic diaphragm and said electrically insulative reference plate the capacitance of said capacitive pressure transducer when unfilled having a negative temperature coefficient resulting from the modulus of elasticity of said unit which substantially departs from a rated capacitance throughout a desired useful range of 50% to 100% of full scale pressure; and
    means for substantially reducing said departure from said rated capacitance in said desired useful range, sand means including a small absolute pressure with a positive temperature coefficient backfilled in said cavity so that the effects of a negative temperature coefficient of the modulus of elasticity of said diaphragm is substantially reduced over a useful range from 50% to 100% to full scale applied pressure.

4. A capacitive pressure transducer according to claim 3 wherein said electrically insulative elastic diaphragm is made from alumina.

5. A capacitive pressure transducer comprising:
    a pair of electrically insulative members, at least one of said electrically insulative members comprising an elastic diaphragm, said members being disposed one adjacent the other and bonded together by a fired glass frit in a spaced apart relationship to form a sealed cacity;
    an electrically conductive layer applied to the inside surface of each of said members, said conductive layer comprising a central portion and a conductive path electrically connected to said central portion and extending from said central portion into said frit; and
    a small absolute pressure sealed within said cavity providing a positive temperature coefficient which compensates the effect of a negative temperature coefficient of the modulus of elasticity of said members to reduce the error in capacitance of the capacitive pressure transducer over a range from 50 to 100% of full scale applied pressure.

* * * * *